(12) United States Patent
Ma et al.

(10) Patent No.: US 11,741,701 B2
(45) Date of Patent: *Aug. 29, 2023

(54) AUTONOMOUS TASK PERFORMANCE BASED ON VISUAL EMBEDDINGS

(71) Applicant: TOYOTA RESEARCH INSTITUTE, INC., Los Altos, CA (US)

(72) Inventors: Jeremy Ma, San Jose, CA (US); Kevin Stone, Menlo Park, CA (US); Max Bajracharya, Millbrae, CA (US); Krishna Shankar, Los Altos, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/667,217

(22) Filed: Feb. 8, 2022

(65) Prior Publication Data
US 2022/0165057 A1     May 26, 2022

Related U.S. Application Data

(63) Continuation of application No. 16/570,618, filed on Sep. 13, 2019, now Pat. No. 1,128,883.
(Continued)

(51) Int. Cl.
*G06V 20/10* (2022.01)
*G06T 7/73* (2017.01)
(Continued)

(52) U.S. Cl.
CPC ............ *G06V 20/10* (2022.01); *B25J 9/1605* (2013.01); *B25J 9/1661* (2013.01); *B25J 9/1664* (2013.01); *B25J 9/1671* (2013.01); *B25J 9/1697* (2013.01); *G06F 18/214*

(2023.01); *G06F 18/28* (2023.01); *G06N 3/08* (2013.01); *G06T 7/248* (2017.01); *G06T 7/33* (2017.01); *G06T 7/55* (2017.01); *G06T 7/74* (2017.01); *G06T 19/20* (2013.01); *G06V 10/751* (2022.01); *G06V 10/764* (2022.01); *G06V 10/774* (2022.01); *G06V 10/82* (2022.01); *G06V 20/20* (2022.01); *B25J 9/163* (2013.01); *G05B 2219/37567* (2013.01); *G05B 2219/40543* (2013.01);
(Continued)

(58) Field of Classification Search
CPC ... G06T 7/55; G06T 7/74; G06T 2207/10016; G06T 2207/10024; G06T 2207/10028; G06T 7/248; G06T 2207/20104; B25J 9/1605; B25J 9/1661; B25J 9/1664; B25J 9/1671; B25J 9/1697; G06K 9/00664; G06K 9/6202; G06K 9/6255; G06K 9/6256; G06V 10/751; G06V 10/772; G06V 10/774; G06V 20/10; G06N 3/08
USPC .......................................... 382/153, 209, 218
See application file for complete search history.

(56) References Cited

U.S. PATENT DOCUMENTS 10,105,847 B1 * 10/2018 Latimer ................. B25J 9/1605
10,380,751 B1 *  8/2019 Jones ..................... G01K 13/02
(Continued)

*Primary Examiner* — Daniel G Mariam
(74) *Attorney, Agent, or Firm* — SEYFARTH SHAW LLP

(57) ABSTRACT

A method for controlling a robotic device is presented. The method includes capturing an image corresponding to a current view of the robotic device. The method also includes identifying a keyframe image comprising a first set of pixels matching a second set of pixels of the image. The method further includes performing, by the robotic device, a task corresponding to the keyframe image.

19 Claims, 9 Drawing Sheets

Related U.S. Application Data

(60) Provisional application No. 62/877,792, filed on Jul. 23, 2019, provisional application No. 62/877,791, filed on Jul. 23, 2019, provisional application No. 62/877,793, filed on Jul. 23, 2019.

(51) Int. Cl.

| | | |
|---|---|---|
| *G06T 7/55* | (2017.01) | |
| *B25J 9/16* | (2006.01) | |
| *G06N 3/08* | (2023.01) | |
| *G06T 19/20* | (2011.01) | |
| *G06T 7/246* | (2017.01) | |
| *G06T 7/33* | (2017.01) | |
| *G06V 20/20* | (2022.01) | |
| *G06F 18/28* | (2023.01) | |
| *G06F 18/214* | (2023.01) | |
| *G06V 10/764* | (2022.01) | |
| *G06V 10/774* | (2022.01) | |
| *G06V 10/82* | (2022.01) | |
| *G06V 10/75* | (2022.01) | |

(52) U.S. Cl.
CPC ..... *G05B 2219/40564* (2013.01); *G06T 2200/04* (2013.01); *G06T 2207/10016* (2013.01); *G06T 2207/10024* (2013.01); *G06T 2207/10028* (2013.01); *G06T 2207/20081* (2013.01); *G06T 2207/20104* (2013.01)

(56) References Cited

U.S. PATENT DOCUMENTS

| | | | |
|---|---|---|---|
| 11,288,883 B2 | 3/2022 | Ma et al. | |
| 2013/0343640 A1* | 12/2013 | Buehler | B25J 9/0087 |
| | | | 382/155 |
| 2018/0215044 A1* | 8/2018 | Maruyama | B25J 19/023 |
| 2020/0043130 A1* | 2/2020 | Qi | G06T 3/0031 |

* cited by examiner

AUTONOMOUS TASK PERFORMANCE BASED ON VISUAL EMBEDDINGS

CROSS-REFERENCE TO RELATED APPLICATIONS

The present application is a continuation of U.S. patent application Ser. No. 16/570,618, filed on Sep. 13, 2019, and titled "AUTONOMOUS TASK PERFORMANCE BASED ON VISUAL EMBEDDINGS," which claims the benefit of U.S. Provisional Patent Application No. 62/877,792, filed on Jul. 23, 2019, and titled "KEYFRAME MATCHER," U.S. Provisional Patent Application No. 62/877,791, filed on Jul. 23, 2019, and titled "VISUAL TEACH AND REPEAT FOR MANIPULATION—TEACHING VR," and U.S. Provisional Patent Application No. 62/877,793, filed on Jul. 23, 2019, and titled "VISUALIZATION," the disclosures of which are expressly incorporated by reference in their entirety.

BACKGROUND

Field

Certain aspects of the present disclosure generally relate to robotic devices and, more particularly, to a system and method for using stored memories of an environment to interact with the environment.

Background

Autonomous agents (e.g., vehicles, robots, drones, etc.) and semi-autonomous agents use machine vision for analyzing areas of interest in a surrounding environment. In operation, autonomous agents may rely on a trained neural network to identify objects within areas of interest in an image of a surrounding environment. For example, a neural network may be trained to identify and track objects captured by one or more sensors, such as light detection and ranging (LIDAR) sensors, sonar sensors, red-green-blue (RGB) cameras, RGB-depth (RGB-D) cameras, and the like. The sensors may be coupled to, or in communication with, a device, such as the autonomous agent. Object detection applications for autonomous agents may analyze sensor image data for detecting objects (e.g., pedestrians, cyclists, other cars, etc.) in the surrounding scene from the autonomous agent.

In conventional systems, the autonomous agents are trained to perform a task using a feature based approach. That is, the task is performed based on features extracted from an image of a current view of the robotic device. The features of an image are limited to unique elements of an object in an image. Accuracy of conventional object detection systems may be limited if an image does not have many features. It is desirable to improve the accuracy of vision systems.

SUMMARY

In one aspect of the present disclosure, a method for controlling a robotic device is disclosed. The method includes capturing an image corresponding to a current view of the robotic device. The method also includes identifying a keyframe image comprising a first set of pixels matching a second set of pixels of the image. The method further includes performing, by the robotic device, a task corresponding to the keyframe image.

In another aspect of the present disclosure, a non-transitory computer-readable medium with non-transitory program code recorded thereon is disclosed. The program code is for controlling a robotic device. The program code is executed by a processor and includes program code to capture an image corresponding to a current view of the robotic device. The program code also includes program code to identify a keyframe image comprising a first set of pixels matching a second set of pixels of the image. The program code further includes program code to perform, by the robotic device, a task corresponding to the keyframe image.

Another aspect of the present disclosure is directed to a robotic device. The apparatus having a memory and one or more processors coupled to the memory. The processor(s) is configured to capture an image corresponding to a current view of the robotic device. The processor(s) is also configured to identify a keyframe image comprising a first set of pixels matching a second set of pixels of the image. The processor(s) is further configured to perform a task corresponding to the keyframe image.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
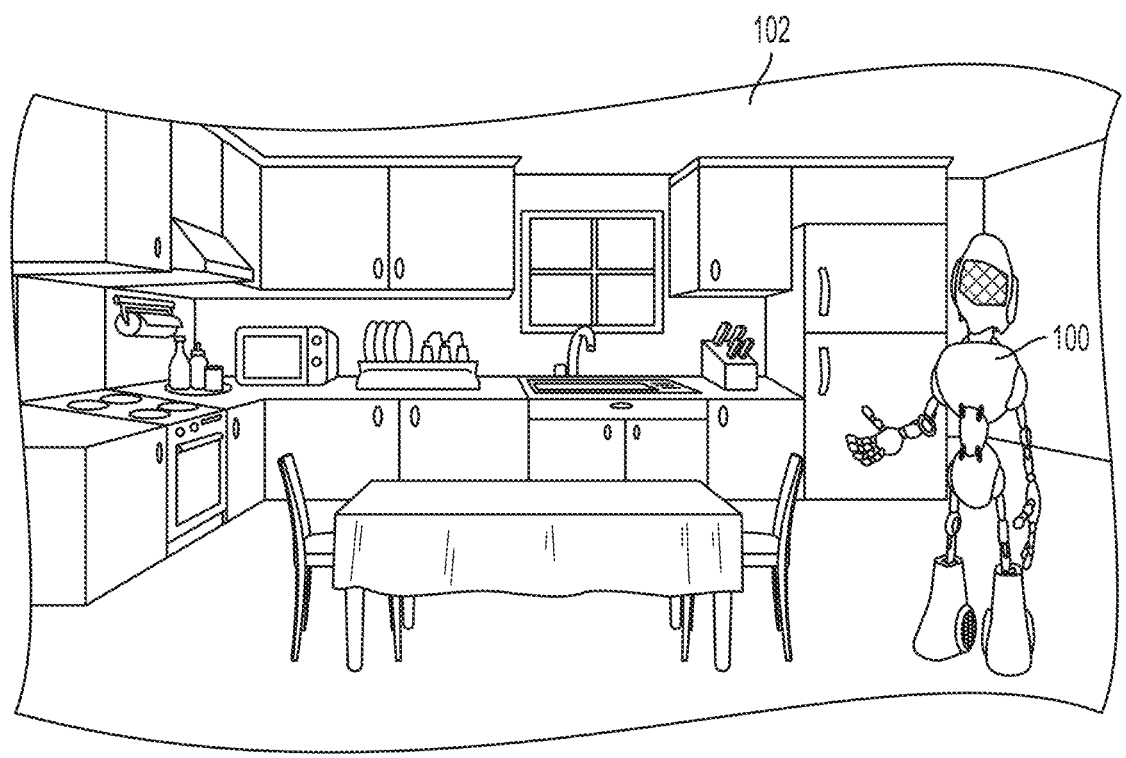
FIG. 1 illustrates an example of an operator controlling a robotic device according to aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks, and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Autonomous agents and semi-autonomous agents may perform a task in response to detected objects. For example, an agent may navigate through the environment, identify objects in the environment, and/or interact with objects in the environment. In the present application, a robot or robotic device refers to an autonomous agent or a semi-autonomous agent. For simplicity, the robotic device is referred to as a robot.

Aspects of the present disclosure are not limited to a particular type of robot. Various types of robotic devices with one or more vision systems that provide a vision/visualization output are contemplated. The vision output may be provided to the operator via a video feed.

According to aspects of the present disclosure, the robot is capable of mobile manipulation. That is, the robot has the capacity to change a position of end effectors as a function of joint configuration. In one configuration, the robot is equipped with automatic whole-body control and planning. This enables a person/human operator to seamlessly demonstrate task space end-effector motions in virtual reality (VR) with little or no concern about kinematic constraints or the robot's posture.

The robot includes one or more field-of-view red-green-blue and depth (RGB-D) sensors on a pan/tilt head, which gives human operator in virtual reality significant context to perform a task. An RGB-D image is a combination of an RGB image and its corresponding depth image. A depth image is an image channel in which each pixel relates to a distance between the image plane and the corresponding object in the RGB image.

The robot may navigate through an environment based on images obtained from a video feed (e.g., image feed) of an environment. The robot may also perform tasks based on images from the video feed. In the conventional vision systems, the robot identifies an image (e.g., an image of an object) using a feature-based approach.

In conventional systems, the robot is trained to perform a task using a feature based approach. That is, the task is performed based on features extracted from an image of a current view of the robot. The feature based approach identifies a test image (e.g., current image) by finding similarities between the test image and a reference image. Specifically, conventional vision systems compare features of the test image to features of the reference image. The test image is identified when the features match the features of the reference image. In some cases, conventional robots are not able to carry out the same task when the starting point and/or orientations/locations of objects do not align with the programmed or taught task.

A feature refers to a distinct (e.g., unique) characteristic of an image (e.g., corners, edges, high contrast areas, low contrast areas, etc.). An image may include multiple features. A descriptor encodes the features of an image. A feature vector may be an example of a descriptor. In conventional vision systems, the descriptors are limited to encoding the unique characteristics of an image (e.g., an object in an image).

In most cases, descriptors are robust against image transformations (e.g., localization, scale, brightness, etc.). That is, a conventional vision system may identify objects in varying conditions, such as varying lighting conditions. Still, the robustness is limited because the descriptors are limited to the encoding the unique characteristics of the image. To improve a robot's ability to perform tasks in response to identifying images, it is desirable to improve the robustness of object vision systems.

Aspects of the present disclosure are directed to assigning a descriptor to pixels of an image. That is, in contrast to conventional vision systems, aspects of the present disclosure do not limit the descriptors to unique characteristics. As such, the vision system's accuracy may be improved. Specifically, conventional vision systems are limited to comparing distinct characteristics (e.g., features) of the test image to distinct characteristics of the reference image. An image includes more pixels than features. Thus, by comparing pixels instead of features, an accuracy of the comparison is increased.

That is, in one configuration, the vision system compares pixels of a test image to pixels of a reference image. The reference image may be referred to as a keyframe. The keyframe may be obtained during training and is invariant to pose and image transformations. The vision system determines that the test image matches the keyframe when a number of matching pixels is greater than a threshold.

In one configuration, the vision system compares pixel descriptors to identify matching pixels of the test image and keyframe. The pixel descriptors include pixel level information and depth information. The pixel level information includes information such as an RGB value of the pixel as well as the context of the pixel within the image/surrounding pixels.

The context of a pixel includes information to disambiguate the pixel. The size of the context is pixel dependent and is learned during training. For example, a pixel in the middle of a plain white wall would need more context in comparison to a pixel on a highly textured logo on a bottle. The robot learns how much context is needed without hand crafting this function. The depth information indicates the distance from a surface corresponding to the pixel to a sensor used to obtain an image of the surface.

During training, one or more sensors obtain image data of a scene as the robot performs a task. Keyframes are generated from obtained image data. The keyframes may be conceptualized as memories of an environment when the robot was executing a particular task. That is, the keyframe may be set as an anchor for a task or location in the environment. After testing, a trained function corresponding to a keyframe may be performed when the robot matches a current image to the keyframe.

A descriptor may be assigned to pixels of the keyframe. The descriptor may be a vector, or array, of values. For example, the descriptor may be a sixteen element vector. The descriptors (e.g., pixel descriptors) may be used to identify matching images.

After training, the robot may be initialized to perform one or more learned tasks. The robot may collect live image data as it executes a commanded task. The live image data is mapped at the pixel level to pixels within the keyframes as the robot traverses and/or manipulates objects within the environment. The correspondences between the current image and keyframes are determined based on a similarity of the pixel descriptors.

That is, the robot compares values of the pixel descriptors in the current image and to the pixel descriptors of the keyframes. A confidence in the comparison indicates how likely a pixel from the current image matches with a pixel from a keyframe. A rigid body assumption may be used to determine a confidence in a match. That is, the confidence may be determined based on a pairwise distances between points on an object in the current image and the keyframe. The confidence increases when the distances between points of an object remain constant regardless of the pose of both images. The pose of the image refers to the pose of the robot when the image was captured. The confidence decreases when the distances between points of an object changes between images having different poses.

The robot may also visual a confidence of a match using a diagonal/parallel correspondence (e.g., non-crossing relative relationship) between multiple pixels of the current image data and the keyframe. The visualization may be transmitted to a remote operating center. A crossing relationship indicates a pixel mismatch between the current image data and the keyframe.

In one configuration, the robot is positioned in the environment and image data of the scene is collected. The robot is then controlled (e.g., through a virtual reality interface) to carry out a task. Restricting the human operator's view, in virtual reality, to the robot's view, during training, improves the robot's ability to perform the task on its own.

Robots may be taught to perform an action/task by parameterizing behaviors performed by the operator through the virtual reality interface. For example, the virtual reality interface may include the use of paddles, handheld controllers, paintbrush tools, wiping tools and/or placement tools manipulated by the operator while wearing a headset depicting a VR environment. Thus, rather than teaching direct task space motions, the human operator teaches a set of parameterized primitives (or behaviors). The parameterized primitives combine collision free motion planning and hybrid (position and force) Cartesian control, to reduce the taught parameters and provide robustness during execution.

Parameterized behaviors refer to learning a task by chunking that task into a smaller number of discrete behaviors. Each behavior is defined by a set of parameters, such as a joint angle change, a rotation angle, or the like. The values of these parameters may be configured and updated based on the situation of the robot when executing the task.

Parameterized behaviors may be learned and extracted from one learned task and combined together with other tasks to form a larger task. A parameterized behavior, such as opening a door having a rotating handle, may be implemented to execute opening any door handle (e.g., one that requires thirty (30) degrees of rotation or one that requires sixty (60) degrees or more of rotation). For example, the degrees of rotation may be one parameter that defines the parameterized behavior of opening a door having a rotating door handle.

To perform a task, the robot may be positioned (relative to an initial position during training) within the same or similar environment. The robot may be positioned at a different starting location and optionally with a different starting pose (e.g., joint angles are adjusted to different starting positions) relative. The robot may be tasked (without control of the human operator) with carrying out the same task (e.g., a set of parameterized behaviors) such as picking up a bottle, opening a cabinet, and placing the bottle within the cabinet. For example, the robot may carry out the same task by updating the parameters of the behaviors that were taught during the virtual reality controlled sequence. The parameters may be updated based on a current pose and/or location of the robot, relative to the pose and/or location used during training.

As discussed, to update the parameters, the robot captures an initial image of the scene and maps pixels and/descriptors from the new image to the keyframe. The mapping defines a relative transform between the new image and the keyframe. The relative transform provides a mapping of the keyframe to the new image. The relative transform may be defined by a change in an x-axis position, y-axis position, z-axis position, roll, pitch, and yaw of the robot. The relative transform may be used to update the parameters of the parameterized behavior from the taught parameters to the observed situation.

The relative transform may be applied to the parameterized behaviors. By applying the relative transform to the parameterized behaviors, the robot may carry out the same task as previously taught even if the starting position and/or pose has changed. The robot system may continuously map pixels and/or dense neural network descriptors from the present scene to those from the keyframe, such that adjustments may be made at an interval (e.g., continuously) to the parameterized behaviors. For example, the relative transform may be applied to a taught action, defined by a set of parameterized behaviors, such as pulling open a drawer, opening a door, picking up a cup or bottle, or the like.

In some aspects, actions may be related to an entire scene and/or specific to an object. For example, an action to pick up a bottle may include the use of keyframes related to the entire scene to navigate to a bottle. Once the bottle is approached, keyframes specific to the bottle may be analyzed independent of the environment.

Navigation behavior may be used to move the robot from one point to another. This may allow the robot to locate an object such as a bottle that may be anywhere within an environment and then perform a task such as "picking up" the bottle regardless of where it is located during the training of "picking up" action. A manipulation behavior is used to move parts of the robot (e.g., torso and/or arms) to make contact with the desired object.

FIG. 1 illustrates an example of an operator 100 controlling a robot 106 according to aspects of the present disclosure. As shown in FIG. 1, an operator 100 is provided with a vision system 102 and motion controllers 104 (e.g., gesture tracking system) for controlling a robot 106. In this example, the operator 100 may control the robot 106 to perform one or more tasks. In the example of FIG. 1, the robot 106 is trained in a kitchen 108. Aspects of the present disclosure are not limited to training the robot 106 in a kitchen 108, other environments are also contemplated.

The vision system 102 may provide a video feed as well as capture the operator's 100 gaze. The operator 100 may be in a location that is remote from a location of the robot 106. In the present example, the robot 106 is located in a kitchen 108 and the operator 100 is in a location that is different from the kitchen 108, such as a robot control center 114.

The vision system 102 may provide a video feed of the location of the robot 106. For example, the vision system 102 may provide a view of the kitchen 108 based on the robot's 106 forward perspective. Other perspectives, such as a 360° view may be provided. The perspectives are provided via one or more vision sensors, such as a video camera, of the robot 106. The vision system 102 is not limited to a head-set, as shown in FIG. 1. The vision system 102 may also be a monitor 110, an image projector, or another system capable of displaying a video feed from the robot 106.

One or more actions of the robot 106 may be controlled via the motion controllers 104. For example, the motion controllers 104 capture the operator's 100 gestures and the robot 106 mimics the captured gestures. The operator 100 may control the robot's 106 locomotion, limb movement, and other actions via the motion controllers 104. Aspects of the present disclosure are not limited to capturing the operator's 100 gestures via the motion controllers 104. Other types of gesture capturing systems are contemplated. The operator 100 may control the robot 106 via a wireless connection 112. Additionally, the robot 106 may provide feedback, such as the video feed, to the operator 100 via the wireless connection 112.

The robot 106 may be trained to navigate through the specific environment (e.g., kitchen 108) and/or similar environments. Additionally, the robot 106 may be trained to perform tasks on objects in the specific environment and/or similar objects in any environment. For example, the robot 106 may be trained to open/close a drawer in the kitchen 108. The training may be implemented for only the drawers in the kitchen 108 and/or similar drawers in any environment, such as a drawer of another kitchen.

Figure 2A:
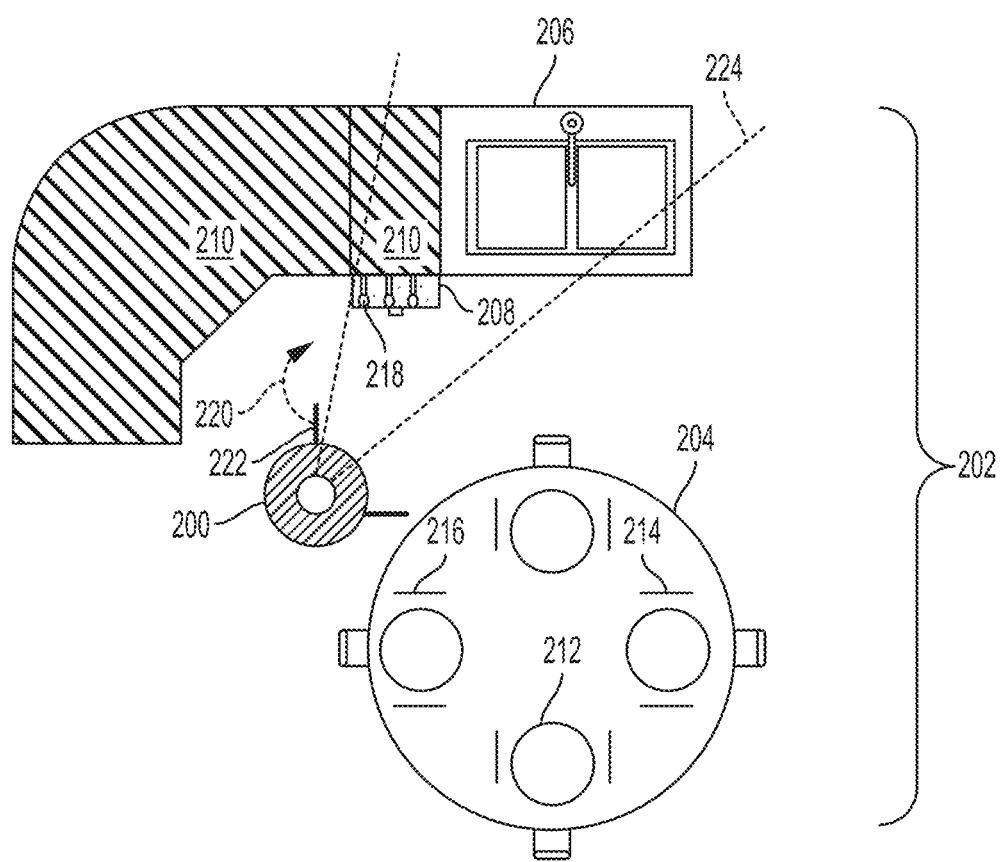
FIG. 2A illustrates an example of a robotic device operating in an environment according to aspects of the present disclosure.

FIG. 2A illustrates an example of a robot 200 in an environment 202 according to aspects of the present disclosure. For clarity, FIG. 2A provides a top-down of the environment 202. As shown in FIG. 2A, the environment 202 includes a dining table 204, a sink 206, a drawer 208 with spoons 218, and a counter 210.

In the example of FIG. 2A, the open drawer 208 is in the robot's 200 field of view 224 (e.g., gaze). The open drawer 208 would be displayed in the current image data captured by the robot's 200 sensor. In one configuration, the robot 200 compares the current image data to keyframe data to determine whether an action should be performed.

Figure 2B:
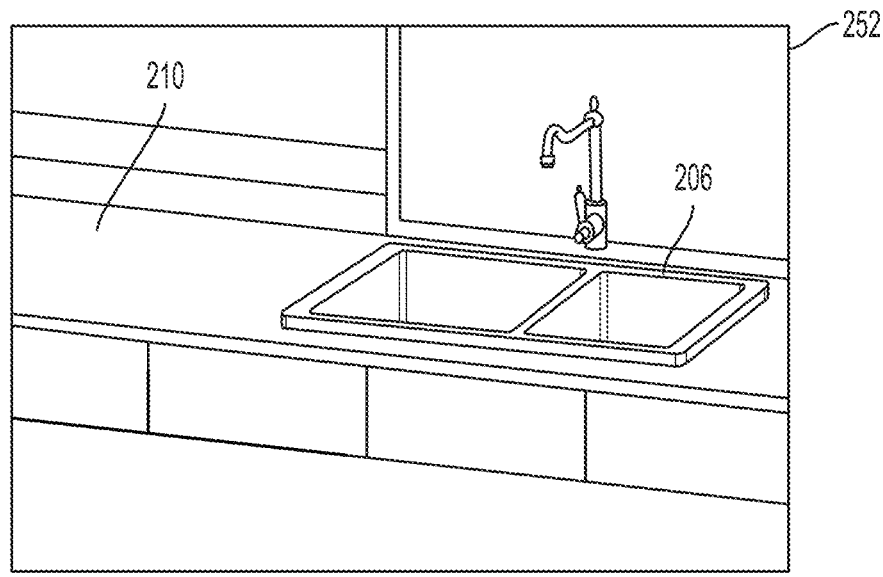
FIG. 2B illustrates an example of an image captured by a robotic device according to aspects of the present disclosure.

FIG. 2B illustrates an example of a current image 252 captured by the robot 200 during testing. As shown in FIG. 2B, based on the robot's 200 field of view 224, the current image 252 includes a sink 206, and a counter 210. In one configuration, the robot 200 compares pixel descriptors of the current image 252 to pixel descriptors of a keyframe to determine a subsequent action and/or to determine the robot's location in an environment.

Figure 2C:
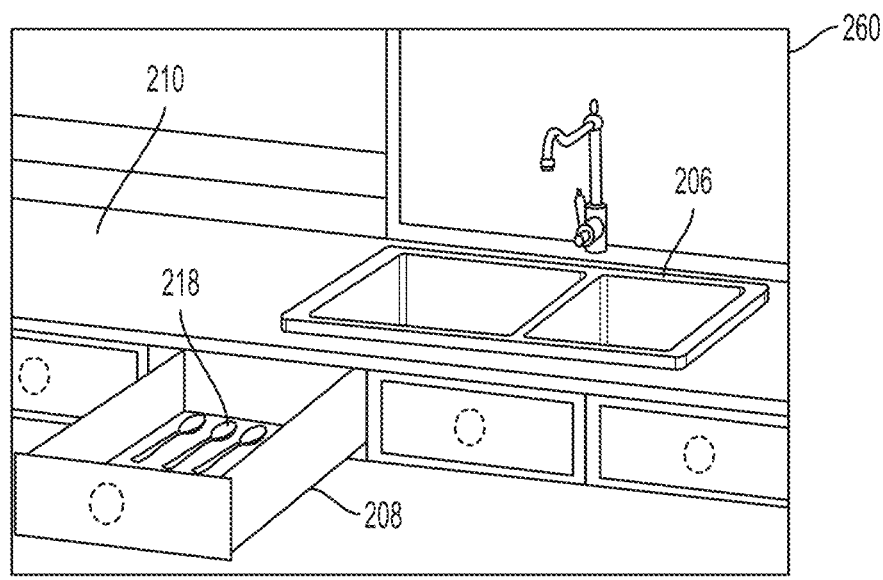
FIG. 2C illustrates an example of a keyframe according to aspects of the present disclosure.

FIG. 2C illustrates an example of a keyframe 260 captured by the robot 200 during training. As shown in FIG. 2C, the keyframe 260 includes the sink 206, counter 210, drawer 208, and spoons 218. The keyframe 260 may be captured in an environment (e.g., location) that is different from or the same as the environment where the robot 200 captured the current image 252. The angle and/or depth of the keyframe 260 may be different from or the same as the angle and/or depth of the current image 252. For simplicity, in the examples of FIGS. 2B, 2C, and 2D, the angle and depth of the keyframe 260 a keyframe and the current image 252 are the same.

In one configuration, a user annotates areas of the keyframe 260 that are considered anchor areas. For example, in FIG. 2C, the spoons 218 and drawer 208 are dynamic objects that may move. In contrast, the top of the faucet or an edge of the sink are static objects. Therefore, the user may annotate the static objects, such that the pixels of the static objects are used to determine whether a current image matches a keyframe. Annotating pixels of static objects (e.g., anchors) may improve an accuracy of a pose delta.

Figure 2D:
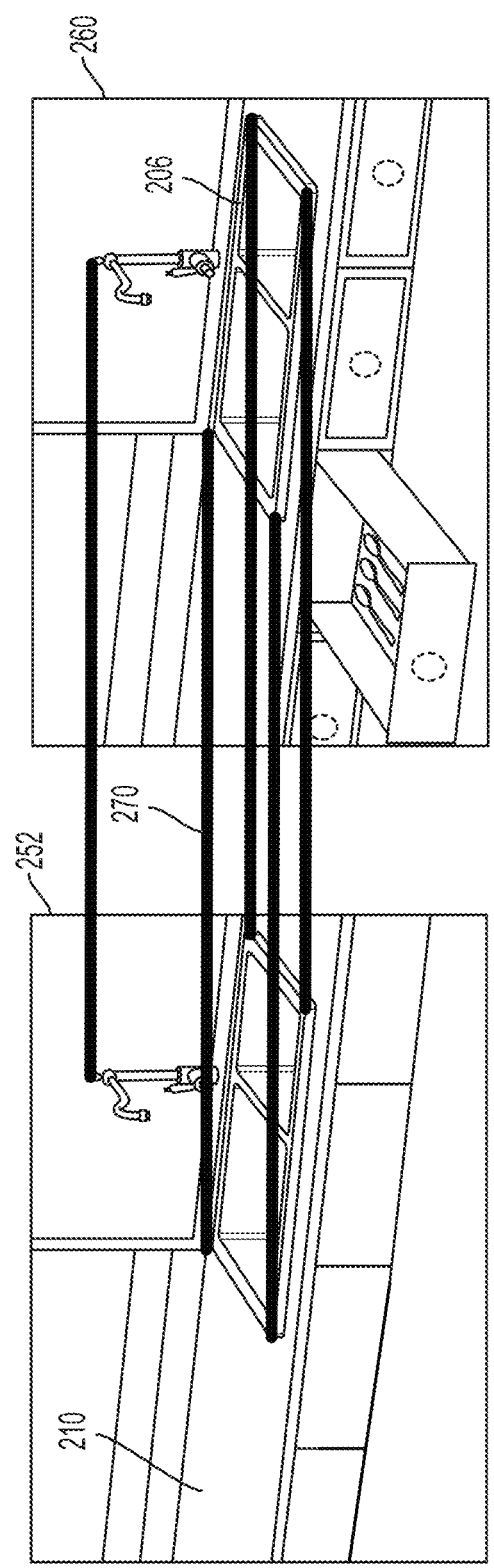
FIG. 2D illustrates an example of keyframe matching according to aspects of the present disclosure.

FIG. 2D illustrates an example of comparing the current image 252 to the keyframe 260 according to aspects of the present disclosure. In one configuration, the robot 200 compares pixel descriptor (e.g., values of the pixel descriptors) of the current image 252 to pixel descriptors of the keyframe 260. The lines 270 between the current image 252 and the keyframe 260 illustrate the pixels that are matched between the two images.

The images may be matching when two or more of the lines 270 do not cross. Whereas a mismatch may be identified when two or more lines 270 cross. The current image 252, the keyframe 260, and the lines 270 may be output at a display of an operating center. The number of pixels compared in FIG. 2D are used for illustrative purposes. Aspects of the present disclosure are not limited to comparing only the number of pixels compared in FIG. 2D.

As discussed, after training, the robot may be initialized to perform one or more learned tasks. For example, the robot may be tasked with navigating through an environment and/or manipulating objects in the environment. The robot collects live image data as it executes a commanded task. The live image data is compared with the keyframes.

In one configuration, a confidence in the matching pixels between the current image data and the keyframe is visualized. The display may also visualize the comparison of pixel descriptors to various thresholds. For example, if the depth of the image is greater than a threshold, the image may be rejected.

When one or more keyframes are matched to the current image data, a behavior associated with the matched keyframes may be executed. For example, in FIG. 2D, upon determining that the current image 252 matches the keyframe 260, the robot may perform a task, such as opening or closing a drawer. As another example, the robot may turn on/off the faucet. Additionally, or alternatively, a behavior may be queued up execution once a previous behavior is completed. As another example, the robot may determine its current location based on the keyframe and use the current location to navigate on a path to another location. New keyframes may be referenced, as the robot moves through an environment or changes a position of an object in the environment.

In one configuration, one or more pixels are filtered prior to comparing the pixel descriptors. A function may be performed to filter the outliers—for example, the random sample consensus (RANSAC) function may be used to filter pixel outliers by randomly sampling the observed data. Filtering pixels reduces noise and improves accuracy.

As discussed, a depth and/or angle of a current image may be different from a depth and/or angle of a matched keyframe. As such, in one configuration, a relative transformation between the matched pixels of the current image data and the pixels of the keyframe is determined. That is, a pose delta may be determined based on the comparison of the current image and the keyframe. The delta refers to the change in the robot's pose from the keyframe to the current image.

The pose delta may be determined based on depth information in the pixel descriptors. The depth information refers to the distance from the sensor to the object corresponding to a pixel. The pose delta refers to an (x, y, z) coordinate, roll, pitch, and yaw transformation between the current image and the keyframe. That is, the pose delta explains how the image was transformed based on the sensor movement from the keyframe to the current image.

Accuracy of the pose delta increases in relation to an increase in a number of matching pixels. In the present disclosure, a number of matching pixels may be greater than a number of matching features. As such, aspects of the present disclosure improve the accuracy of determining a pose delta in comparison to conventional systems that only compare images based on features. A least squared function may be used to determine the pose delta.

That is, the pose may be determined by minimizing a squared reprojection error. Specifically, pixels in the keyframe should be close matching pixels found in the current image. Minimizing a squared reprojection error may be expressed as a non-linear least squares problem that may be solved for the 6 unknown parameters (x, y, z, roll, pitch, yaw). A RANSAC loop may be used to reduce sensitivity to outliers.

The pose delta (e.g., relative transformation) between one or more number values of the pixel descriptors of the pixels may be used to update the parameters of the behavior that is to be executed. For example, if the pose delta indicates that the robot is positioned one foot further away from an object as compared to the position defined in the keyframe, the behavior may be updated to account for the robot's current position (e.g., pose). The position defined in the keyframe refers to the position used to train the robot to perform the task.

Figure 3:
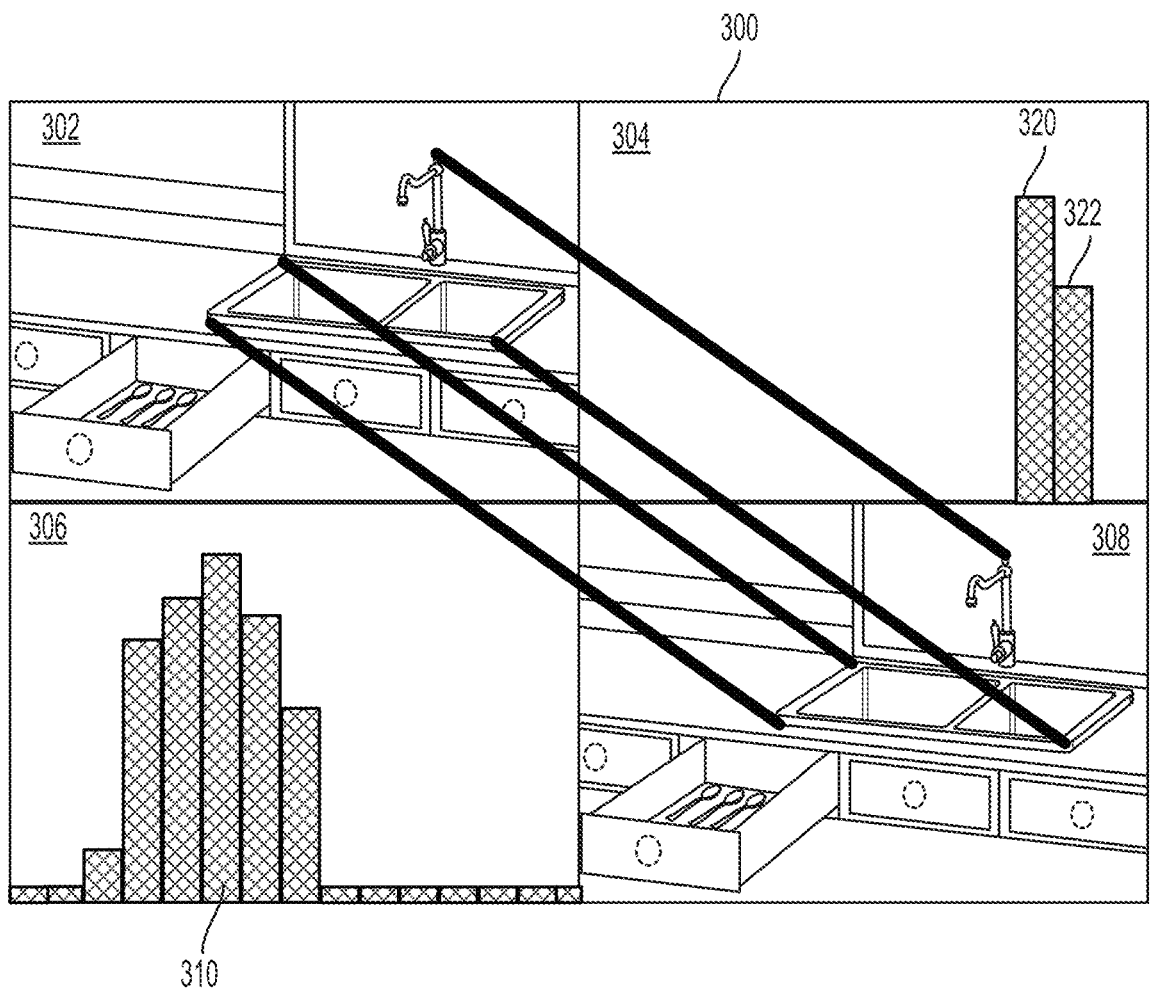
FIG. 3 illustrates an example of a visual output generated based on information provided from a robotic device operating in an environment according to aspects of the present disclosure.

FIG. 3 illustrates an example of an output 300 from a vision system according to aspects of the present disclosure. As shown in FIG. 3, the output 300 includes a current image 302, a keyframe 308, a histogram 306, and a threshold window 304. The output 300 may be displayed at a location that is remote from a current location of the robot. For example, the output 300 may be displayed at a control center that controls the operation of the robot.

The current image 302 is an image from a current view of the robot. The keyframe 308 is a keyframe from a set of keyframes that is compared to the current image 302. The histogram 306 illustrates a confidence score for the matching of the current image 302 to each keyframe of the set of keyframes.

During training, for a navigation task, the robot captures a keyframe at certain points along the route—from start to finish. The keyframes captured along the route are used as the set of keyframe for the navigation task. During testing, the robot compares the current image to the set of keyframes to identify its current location.

Based on a number of matching pixels (e.g., pixel descriptors), the robot determines a matching confidence for the current image to a particular keyframe. When a matching confidence is greater than a threshold, the robot performs a task associated with the matched keyframe. The task may include localization (e.g., determining the robot's current position). In the example of FIG. 3, the robot determines that it is at a location on a route corresponding to the location of the keyframe with the greatest matching confidence 310.

The histogram 306 may differ based on the task. The histogram 306 in FIG. 3 is for a navigation task. The histogram 306 would differ if the robot is executing a manipulation (e.g., object manipulation) task. A set of key frames for a manipulation task may have less keyframes in comparison to a set of keyframes for a navigation task.

For example, for opening a cabinet, the robot may be trained to open a cabinet if the cabinet is closed or partially open. In this example, the histogram would include two keyframe matching bars in the bar graph. One bar would illustrate the confidence of the current image matching the closed cabinet keyframe and another bar would illustrate the confidence of the current image matching the partially open cabinet keyframe.

The pose confidence window 304 illustrates a confidence in a pose match from a pose matcher. In one configuration, prior to determining a pose delta, the robot determines whether a number of criteria satisfy one or more thresholds. The criteria may be based on depth, pose, clique, error, and other elements.

In one configuration, the robot determines a number of pixels with a depth value. For some surfaces, such as glass or shiny surface, the robot may not be able to determine the depth. As such, pixels corresponding to these surfaces may not have a depth value. The number of pixels with a depth value may be determined prior to filtering the pixels. If the number of pixels with a depth value is greater than a threshold, a depth criteria is satisfied. The pose confidence window 304 may include a bar graph comparing a bar 320 for the number of pixels with a depth value to a bar 322 representing the threshold. The bar graph may be color coded.

Additionally, or alternatively, a bar graph of the pose confidence window 304 may include a comparison of a bar for the number of features that align between the current image and a keyframe to a bar for an alignment threshold. To determine an accuracy of a match between a keyframe and a current image, the robot may apply a pose transform and determine how many features of objects in a current image align with the features of the object in the keyframe, and vice versa. Features may not align if a feature is tied to a non-static object. For example, the keyframe may include a cup that is no longer present in the current image. As such, the features of the cup would not align between the images.

The number of features that align may be referred to as a clique inlier. A pose delta may be generated when the clique inlier is greater than a threshold.

Additionally, or alternatively, a bar graph of the pose confidence window 304 may include a comparison of a bar for a number of features used to determine a pose to a bar for a pose threshold. That is, a certain number of features should be used to determine a pose. If the number of features used to determine a pose is less than the pose threshold, the pose delta may not be computed. The number of features used to determine a pose may be referred to as a pose inlier.

The bar graph of the pose confidence window 304 may also include a comparison of a bar for a root mean square (RMS) error for the pose delta to a threshold. If the RMS error is less than the RMS error threshold, the pose delta may be satisfactory. If the RMS error is greater than the RMS error threshold, the user or robot may not use the pose delta to perform the task.

The pose confidence window 304 is not limited to a bar graph, other graphs or images may be used. The criteria for the pose confidence window 304 is not limited to the discussed criteria, other criteria may be used.

As discussed, aspects of the present disclosure are directed to a mobile manipulation hardware and software system capable of autonomously performing human-level tasks in real world environments, after being taught the task with a demonstration from a person in virtual reality. In one configuration, a mobile manipulation robot is used. The robot may include a whole-body task space hybrid position/force control. Additionally, as discussed, parameterized primitives linked to a robust learned dense visual embeddings representation of the scene is taught to the robot. Finally, a task graph of the taught behaviors may be generated.

Rather than programming or training a robot to recognize a fixed set of objects or perform pre-defined tasks, aspects of the present disclosure enable the robot to learn new objects and tasks from a human demonstration. The learned tasks may be executed autonomously by the robot in naturally varying conditions. The robot does not use prior object models or maps, and can be taught to associate a given set of behaviors to arbitrary scenes and objects from one example. The visual system is trained offline on existing supervised and unsupervised datasets, the rest of the system may function without additional training data.

In contrast to conventional systems that teach direct task space motions, aspects of the present disclosure teach a set of parameterized behaviors. These behaviors combine collision free motion planning and hybrid (position and force) Cartesian end-effector control, minimizing the taught parameters and providing robustness during execution.

In one configuration, task specific learned dense visual pixel-wise embeddings are computed. These pixel-wise embeddings link the parameterized behaviors to the scene. Due to the linking, the system may handle diverse environments with high robustness by sacrificing generalization to new situations.

The behaviors of a task may be taught independently, with visual entry conditions, and success-based exit criteria. The behaviors may be chained together in a dynamic task graph. Because the behaviors are chained, the robot may reuse behaviors to perform task sequences.

The robot may include multiple degrees-of-freedom (DOF). For example, the robot may include 31 degrees-of-freedom (DOF) split into five subsystems: the chassis, torso, left arm, right arm, and head. In one configuration, the chassis includes four driven and steerable wheels (e.g., eight total DOF) that enable "pseudo-holonomic" mobility. The drive/steer actuator package may include various motors and gearheads. The torso may include five DOF (yaw-pitch-pitch-pitch-yaw). Each arm may include seven DOF. The head may be a two DOF pan/tilt head. Each arm may also include a single DOF gripper with under-actuated fingers. Aspects of the present disclosure are not limited to the robot discussed above. Other configurations are contemplated. In one example, the robot includes custom tools such as a sponge or a swiffer tool.

In one configuration, a force/torque sensor is integrated with the robot to measure interaction forces with the environment. For example, the force/torque sensor may be placed at a wrist of each arm. The perception sensors may be consolidated on the head to provide a wide field of view while also provide the robot and a person in VR context to perform the task.

Aspects of the present disclosure provide several levels of abstraction for controlling the robot. In one configuration, the lowest control levels provide real-time coordinated control of all of the robot's DOFs. Real-time control may include joint control and part control. Joint control implements low-level device communications and exposes the device commands and statuses in a generic way. Additionally, joint control supports actuators, force sensors, and inertial-measurement-units. The joint control may be configured at run-time to support different robot variations.

Part control may handle higher level coordination of the robot by dividing the robot into parts (e.g., right arm, head, etc.) and providing a set of parameterized controllers for each part. The part control may provide controllers for: joint position and velocity; joint admittance; camera look; chassis position and velocity; and hybrid task space pose, velocity, and admittance control.

End-effector task space control provides another level of abstraction for controlling the robot. This level of abstraction solves for the robots posture, to achieve these desired motions. Whole-body inverse kinematics (IK) for hybrid Cartesian control are formulated as a quadratic program and solved. Parts may be subject to linear constraints on joint position, velocity, acceleration, and gravity torque.

Whole-body IK may be used for motion planning of Cartesian pose goals. In one configuration, occupied environment voxels are fit with spheres and capsules. Voxel collision constraints are added to the quadratic program IK to prevent collisions between the robot and the world. Motion planning may be performed using a rapidly-exploring random tree (RRT), sampling in Cartesian space with the quadratic program IK as the steering function between nodes.

Planning in Cartesian space results in natural and direct motions. Using the quadratic program IK as the steering function improves a reliability of planning, as the same controller may be used to plan and execute, reducing the possible discrepancies between the two. Similarly, motion planning for joint position goals uses an RRT in combination with the part control joint position controller acting as the steering function.

The next level of abstraction defines parameterized behaviors. In one configuration, parameterized behaviors are primitive actions that can be parameterized and sequenced together to accomplish a task. The behaviors may include, but are not limited to: manipulation actions such as grasp, lift, place, pull, retract, wipe, joint-move, direct-control; navigation actions such as drive with velocity commands, drive-to with position commands, and follow-path with active obstacle avoidance; and other auxiliary actions such as look at and stop.

Each behavior can have single or multiple actions of different types, such as joint or Cartesian moves for one or more of the robot's parts. Each action can use different control strategies such as position, velocity or admittance control, and can also choose to use motion planning to avoid external obstacles. The robot's motions, regardless of whether they use motion planning, avoid self-collision and satisfy motion control constraints.

Each behavior may be parameterized by the different actions, which in turn will have their own parameters. For example, a grasp behavior may consist of four parameters: gripper angle, 6D approach, grasp, and (optional) lift poses for the gripper. In this example, these parameters define the following pre-defined sequence of actions: (1) open the gripper to desired gripper angle; (2) plan and execute a collision-free path for the gripper to the 6D approach pose; (3) move the gripper to the 6D grasp pose and stop on contact' (4) close the gripper; and (5) move the gripper to the 6D lift pose.

The final level of control abstraction is a task. In one configuration, a task is defined as a sequence of behaviors that enable the robot to manipulate and navigate in a human environment. A task graph (see FIG. 5) is a directed, cyclic or acyclic, graph with different tasks as nodes and different transition conditions as edges, including fault detection and fault recovery. Edge conditions include the status of each behavior execution, checking for objects in hand using force/torque sensors, voice commands, and keyframe matches to handle different objects and environments.

According to aspects of the present disclosure, a perception pipeline is designed to provide the robot with an understanding of the environment around it. The perception pipeline also provides the robot with an ability to recognize what actions to take, given the task it has been taught. In one configured, a fused RGB-D image is created by projecting the multiple depth images into one wide field-of-view image (e.g., wide field-of-view left image) of the high resolution color stereo pair. The system runs a set of deep neural networks to provide various pixel level classifications and feature vectors (e.g., embeddings). The pixel level classifications and feature vectors are accumulated into a temporal 3D voxel representation based on the visual features recalled from a taught sequence. The pixel level classifications and feature vectors may be used to recall actions to perform.

In one configuration, object categories are not defined. Additionally, or models of objects or the environment are not assumed. Rather than explicitly detecting and segmenting objects, and explicitly estimating 6-DOF object poses, a dense pixel level embedding may be produced for various tasks. The reference embeddings from a taught sequence may be used to perform per behavior classification or pose estimation.

The trained models may be fully convolutional. In one configuration, pixels in the input image are mapped to a point in an embedding space, respectively. The embedding space is endowed with a metric that is implicitly defined by loss functions and training procedures defined by the model's output. The trained models may be used for various tasks.

In one configuration, the trained model detects all objects of a semantic class given a single annotated example. The objects of the semantic class may be detected by comparing the embeddings on the annotation to embeddings seen in other areas. This model may be trained with a discriminative loss function.

A model may be trained to determine object instances. This model identifies and/or counts individual objects. The model may be trained to predict a vector (2D embedding) at each pixel. The vector may point to the centroid of the object containing that pixel. At run-time, pixels that point to the same centroid may be grouped to segment the scene. The run-time execution may be performed in 3D.

A model may also be trained for 3D correspondence. This model produces per pixel embeddings that are invariant to view and lighting, such that any view of a given 3D point in a scene maps to the same embedding. This model may be trained using a loss function.

The pixelwise embeddings (and depth data) for each RGB-D frame is fused into a dynamic 3D voxel map. Each voxel accumulates first and second order position, color, and embeddings statistics. Expiration of dynamic objects is based on back projection of voxels into the depth image. The voxel map is segmented using standard graph segmentation based on the semantic and instance labels, and geometric proximity. The voxel map is also collapsed down into a 2.5D map with elevation and traversability classification statistics.

The voxel map is used for collision free whole-body motion planning, while the 2.5D map is used for collision free chassis motions. For 3D collision checking, the voxels in the map may be grouped into capsules using a greedy approach. The segmented objects may be used by the behaviors to attach objects to hands when they are grasped.

The robot may be taught with a one-shot teaching approach, such that the robot recognizes features in the scene (or of a specific manipulation object) that are highly correlated to features recorded from a previously taught task. When a task is demonstrated by the user, features are saved throughout the task in the form of a keyframe. The keyframe may be an RGB image containing a multi-dimensional embedding with depth (if valid) per pixel.

The embeddings act as a feature descriptor that may establish per pixel correspondences at run-time, assuming that the current image is similar enough to the reference that existed at teach time. Since depth exists at (mostly) each pixel, correspondences can be used to solve for a delta pose between the current and reference images. Inliers may be detected using Euclidian constraints and apply a Levenberg-Marquardt least-squares function with RANSAC to solve for a 6-DOF pose.

The delta pose serves as a correction that can be applied to adapt the taught behavior sequence to the current scene. Because embeddings may be defined at each pixel, keyframes may be as broad as including every pixel in the image, or as narrow as only using pixels in a user-defined mask. As discussed, a user may define a mask by selectively annotating regions of the image to be relevant for the task or on an object.

In addition to visual sensing, in one configuration, the robot collects and processes an audio input. The audio provides another set of embeddings as input for teaching the robot. As an example, the robot acquires audio input by asking questions and understanding spoken language responses from a person. Spoken responses may be understood using a custom keyword-detection module.

The robot may understand a custom wakeword, a set of objects (e.g., "mug" or "bottle") and a set of locations (e.g., "cabinet" or "fridge") using a fully-convolutional keyword-spotting model. In one configuration, the model listens for the wakeword at an interval, such as every 32 ms. When the wakeword is detected, the robot looks to detect an object or location keyword. During training, noise is artificially added to make recognition more robust.

As discussed, to teach the robot a task, the operator uses a set of VR modes. Each behavior may have a corresponding VR mode for setting and commanding the specific parameters of that behavior. Each behavior mode may include customized visualizations to aid in setting each parameter, dependent on the type of parameter. For example, when setting the parameters for a pull door motion, the hinge axis is labeled and visualized as a line and candidate pull poses for the gripper are restricted to fall on the arc about the hinge. To aid in the teaching process, several utility VR modes are used, such as reverting behaviors, annotating the environment with relevant objects, and repositioning of the virtual robot, camera image, and menus in the VR world.

During execution, a pose of the robot and parts of the environment may be different from what was used during training. Feature matching may be used to find features in the environment that are similar to those that were taught. A pose delta may be established from matched feature correspondences. User taught behaviors are transformed by the computed pose delta. In one configuration, multiple keyframes are passed to the matching problem. The best matching keyframe is selected based on the number of correspondences.

Figure 4:
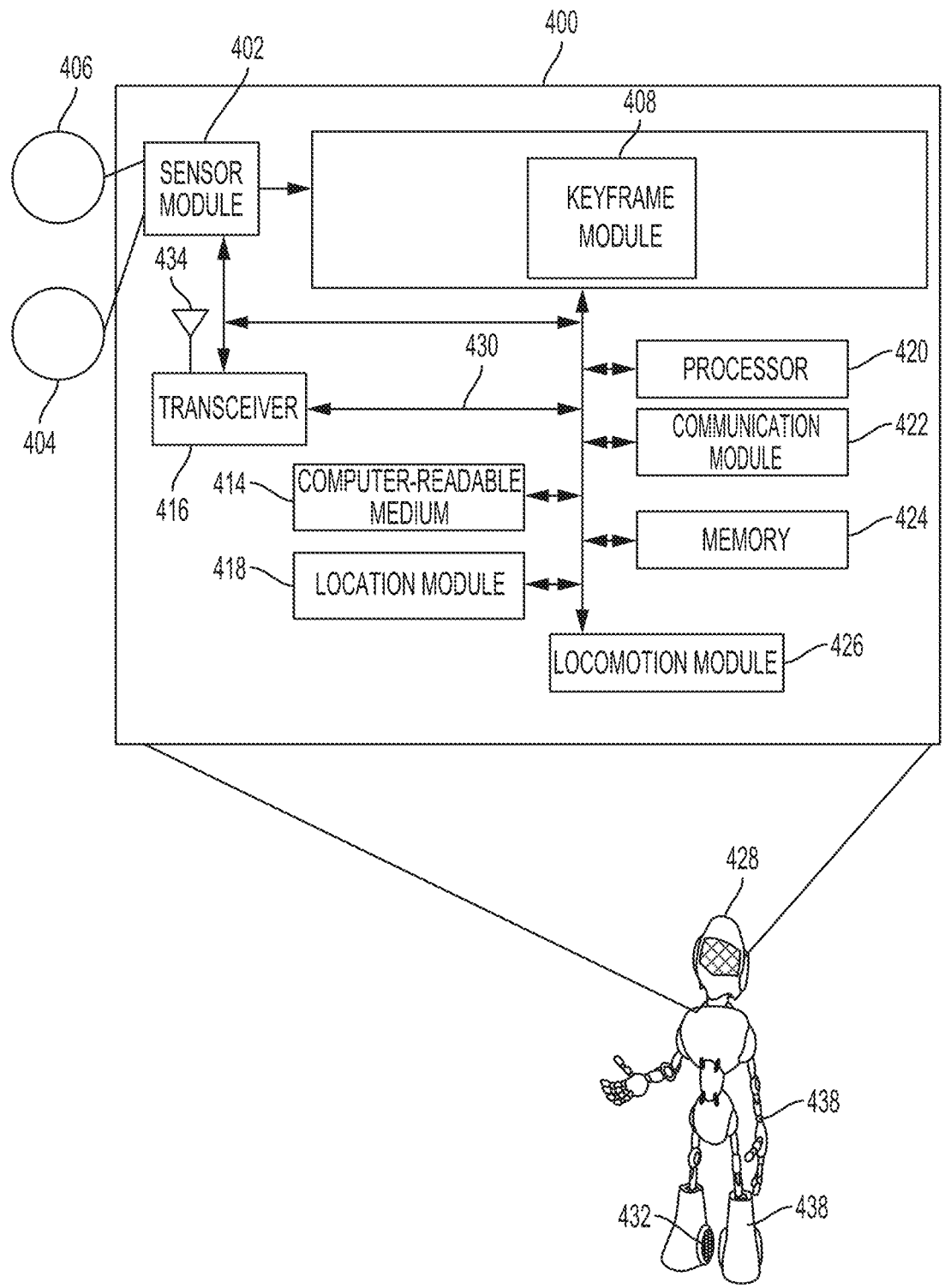
FIG. 4 is a diagram illustrating an example of a hardware implementation for a robotic system according to aspects of the present disclosure.

FIG. 4 is a diagram illustrating an example of a hardware implementation for a robotic system 400 according to aspects of the present disclosure. The robotic system 400 may be a component of an autonomous or semi-autonomous system, such as a vehicle, a robotic device 428, or other device. In the example of FIG. 4, the robotic system 400 is a component of the robotic device 428. The robotic system 400 may be used to control an action of the robotic device 428 by inferring an intent of an operator of the robotic device 428.

The robotic system 400 may be implemented with a bus architecture, represented generally by a bus 430. The bus 430 may include any number of interconnecting buses and bridges depending on the specific application of the robotic system 400 and the overall design constraints. The bus 430 links together various circuits including one or more processors and/or hardware modules, represented by a processor 420, a communication module 422, a location module 418, a sensor module 402, a locomotion module 426, a memory 424, a keyframe module 408, and a computer-readable medium 414. The bus 430 may also link various other circuits such as timing sources, peripherals, voltage regulators, and power management circuits, which are well known in the art, and therefore, will not be described any further.

The robotic system 400 includes a transceiver 416 coupled to the processor 420, the sensor module 402, the keyframe module 408, the communication module 422, the location module 418, the locomotion module 426, the memory 424, and the computer-readable medium 414. The transceiver 416 is coupled to an antennae 434. The transceiver 416 communicates with various other devices over a transmission medium. For example, the transceiver 416 may receive commands via transmissions from an operator of the robotic device 428. As discussed herein, the operator may be in a location that is remote from the location of the robotic device 428. As another example, the transceiver 416 may transmit information regarding the keyframe matching from the keyframe module 408 to the operator.

The robotic system 400 includes the processor 420 coupled to the computer-readable medium 414. The processor 420 performs processing, including the execution of software stored on the computer-readable medium 414 providing functionality according to the disclosure. The software, when executed by the processor 420, causes the robotic system 400 to perform the various functions described for a particular device, such as the robotic device 428, or any of the modules 402, 408, 414, 416, 418, 420, 422, 424, 426. The computer-readable medium 414 may also be used for storing data that is manipulated by the processor 420 when executing the software.

The sensor module 402 may be used to obtain measurements via different sensors, such as a first sensor 406 and a second sensor 404. The first sensor 406 may be a vision sensor, such as a stereoscopic camera or an RGB camera, for capturing 2D images. The second sensor 404 may be a ranging sensor, such as a LiDAR sensor, a RADAR sensor, or RGB-D sensor. Of course, aspects of the present disclosure are not limited to the aforementioned sensors as other types of sensors, such as, for example, thermal, sonar, and/or lasers are also contemplated for either of the sensors 404, 406. The measurements of the first sensor 406 and the second sensor 404 may be processed by one or more of the processor 420, the sensor module 402, the communication module 422, the location module 418, the locomotion module 426, the memory 424, in conjunction with the computer-readable medium 414 to implement the functionality described herein. In one configuration, the data captured by the first sensor 406 and the second sensor 404 may be transmitted as a video feed to the operator via the transceiver 416. The first sensor 406 and the second sensor 404 may be coupled to the robotic device 428 or may be in communication with the robotic device 428.

The location module 418 may be used to determine a location of the robotic device 428. For example, the location module 418 may use a global positioning system (GPS) to determine the location of the robotic device 428. The communication module 422 may be used to facilitate communications via the transceiver 416. The communication module 422 may be configured to provide communication capabilities via different wireless protocols, such as WiFi, long term evolution (LTE), 3G, etc. The communication module 422 may also be used to communicate with other components of the robotic device 428 that are not modules of the robotic system 400.

The locomotion module 426 may be used to facilitate locomotion of the robotic device 428 and/or components (e.g., limbs, hands, etc.) of the robotic device 428. As an example, the locomotion module 426 may control movement of the limbs 438 and/or wheels 432. As another example, the locomotion module 426 may be in communication with a power source of the robotic device 428, such as an engine or batteries. \

The robotic system 400 also includes the memory 424 for storing data related to operation of the robotic device 428 and the keyframe module 408. The modules may be software modules running in the processor 420, resident/stored in the computer-readable medium 414 and/or memory 424, one or more hardware modules coupled to the processor 420, or some combination thereof.

A keyframe module 408 may be in communication with the sensor module 402, the transceiver 416, the processor 420, the communication module 422, the location module 418, the locomotion module 426, the memory 424, and the computer-readable medium 414. In one configuration, the keyframe module 408 receive an input (e.g., image data) from one or more sensors 404, 406 corresponding to a current view of the robotic device 428. The keyframe module 408 may assign a pixel descriptor to each pixel, or a set of pixels, in the input.

The keyframe module 408 identifies a keyframe image with a first set of pixels matching a second set of pixels of the input. The keyframe module 408 may match the pixel descriptors of the input to pixel descriptors of the keyframe image. The keyframe image may be stored in the memory 424, stored in network storage (not shown), or stored in another location. The keyframe images may be captured and stored while the robotic device 428 is trained to perform an action. The pixel descriptors of the keyframe image may be assigned during training.

The keyframe module 408 also controls the robotic device 428 to perform an action corresponding to the keyframe image. The action may be adapted based on a relative transform (e.g., pose delta) between the input and the keyframe image. The keyframe module may determine the relative transform based on a change in distance and/or pose in the input and the keyframe image. The action of the robotic device 428 may be controlled via communications with the locomotion module 426.

Figure 5:
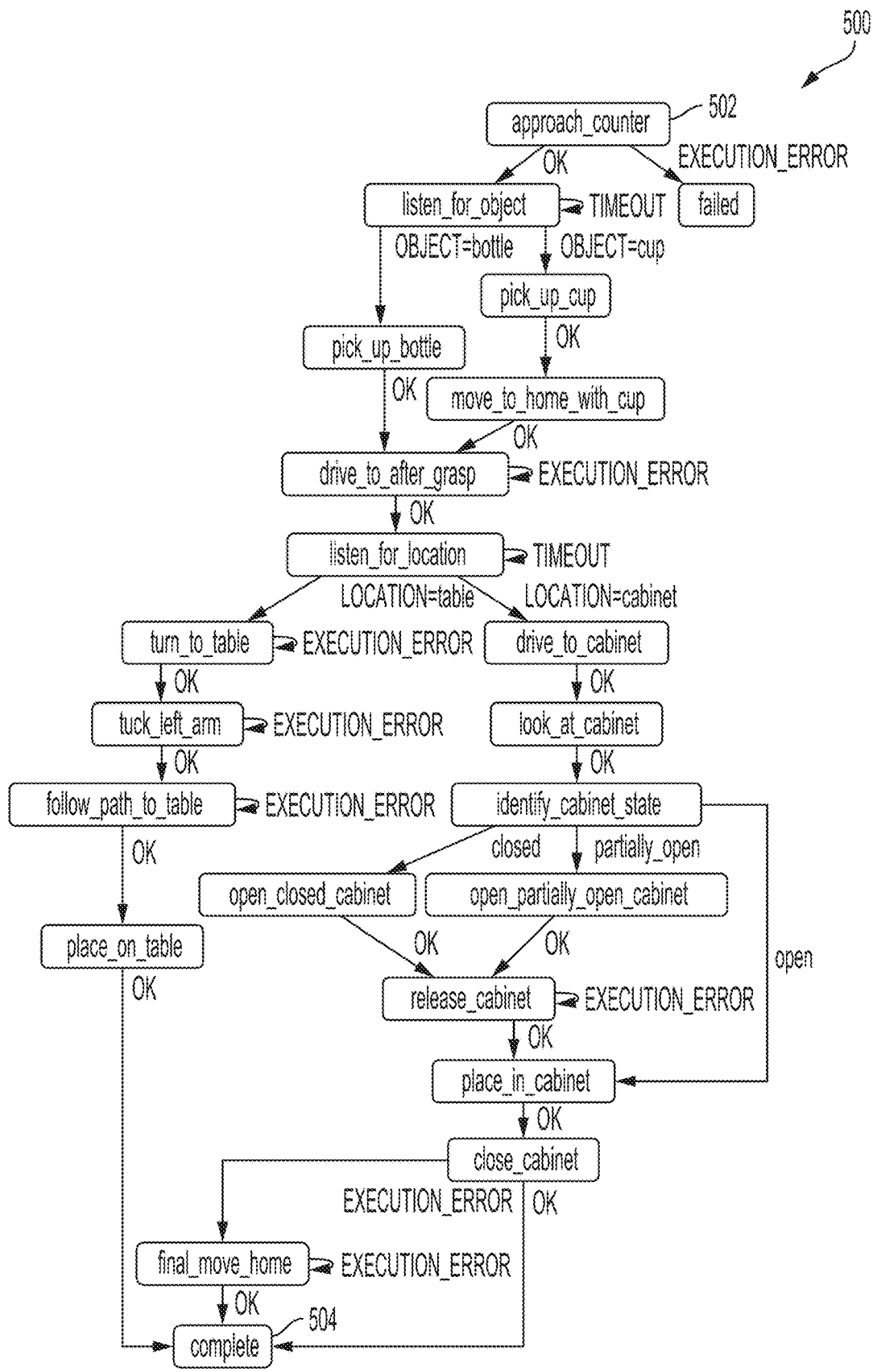
FIG. 5 illustrates graph sequence for taught behaviors according to aspects of the present disclosure.

FIG. 5 illustrates an example of a graph sequence 500 for taught behaviors according to aspects of the present disclosure. As shown in FIG. 5, the graph sequence 500 includes a start node 502 and an end node 504. The graph sequence 500 may branch or loop based on a sensed visual input, audio input, or other conditions.

For example, as shown in FIG. 5, after the start node 502, the robot may execute a "listen_for_object" behavior. In this example, the robot determines whether it has sensed a visual or audio input corresponding to a cup or bottle. In this example, different behavior sequences are executed based on whether the sensed input corresponds to the cup or the bottle. Aspects of the present disclosure are not limited to the behaviors shown in FIG. 5.

Figure 6:
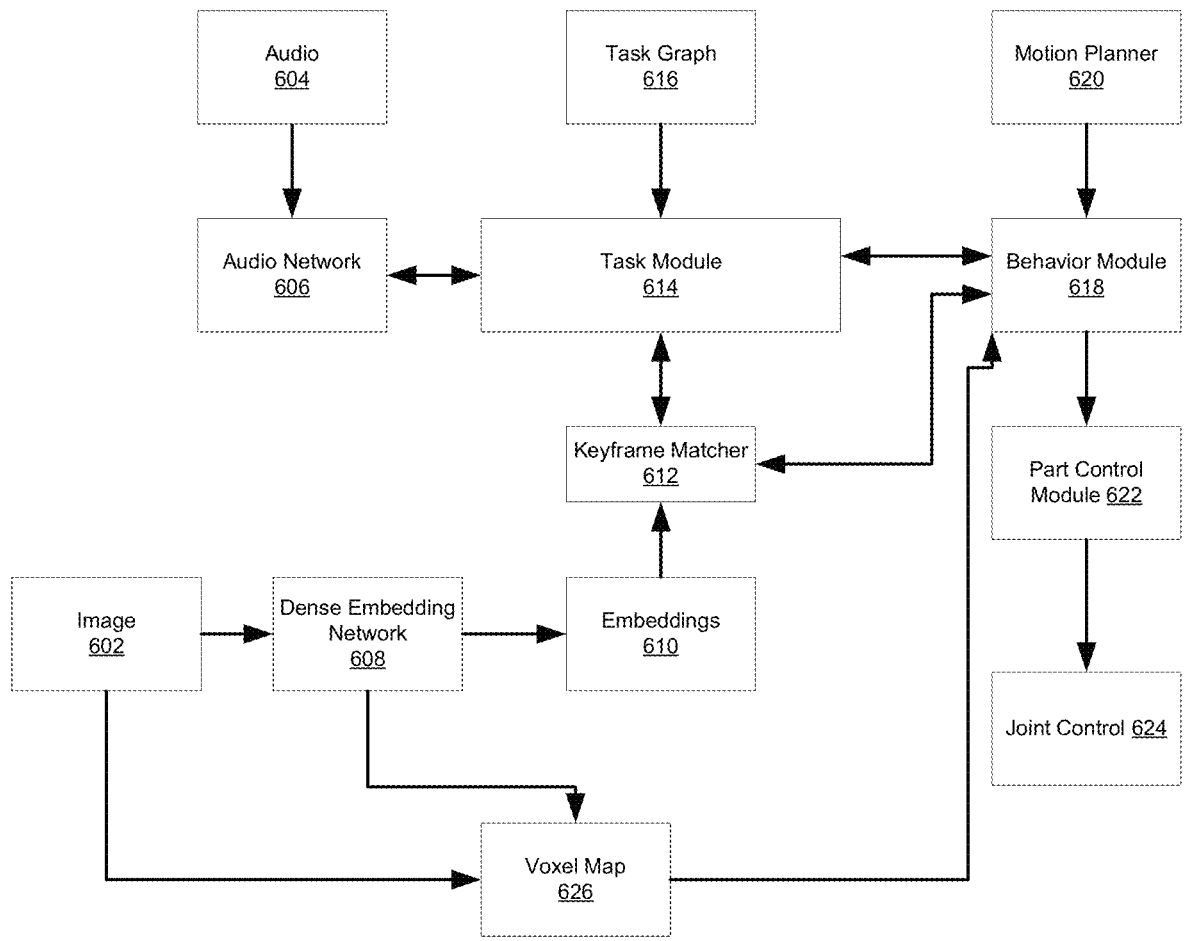
FIG. 6 illustrates software modules for a robotic system according to aspects of the present disclosure.

FIG. 6 illustrates an example of software modules for a robotic system according to aspects of the present disclosure. The software modules of FIG. 6 may use one or more components of the hardware system of FIG. 4, such as the processor 420, communication module 422, location module 418, sensor module 402, locomotion module 426, memory 424, keyframe module 408, and computer-readable medium 414. Aspects of the present disclosure are not limited to the modules of FIG. 6.

As shown in FIG. 6, the robot may receive audio data 604 and/or image data 602. The image data 602 may be an RGB-D image. The audio network 606 may listen for a wakeword at an interval. The audio network 606 receives raw audio data 604 to detect the wakeword and to extract keywords from the raw audio data 604.

A neural network, such as the dense embeddings network 608, receives the image data 602. The image data 602 may be received at an interval. The dense embeddings network 608 processes the image data 602 and outputs the embeddings 610 of the image data 602. The embeddings 610 and image data 602 may be combined to generate a voxel map 626. The embeddings 610 may also be input to a keyframe matcher 612.

The keyframe matcher 612 compares the embeddings 610 to multiple keyframes. A matching keyframe is identified when the embeddings 610 correspond to embeddings of a keyframe. The embeddings 610 may include pixel descriptors, depth information, and other information.

A task module 614 may receive one or more task graphs 616. The task module 614 provides responses to requests from the keyframe matcher 612. The keyframe matcher 612 matches the task to the matched keyframe. The task may be determined from the task graph 616.

The task module 614 may also transmit a behavior request to a behavior module 618. The behavior module 618 provides a behavior status to the task module 614. Additionally, the behavior module 618 may request information regarding matching keyframes and corresponding tasks from the keyframe matcher 612. The keyframe matcher 612 provides information regarding matching keyframes and corresponding tasks to the behavior module 618. The behavior module 618 may also receive voxels from the voxel map 626.

In one configuration, the behavior module 618 receives a motion plan from the motion planner 620 in response to a motion plan request. The behavior module 618 also receives a part status from a part control module 622. The behavior module 618 transmits a part command to the part control module 622 in response to receiving the part status. Finally, the part control module 622 receives a joint status from a joint control module 624. The part control module 622 transmits a joint command to the joint control module 624 in response to receiving the joint status.

Figure 7:
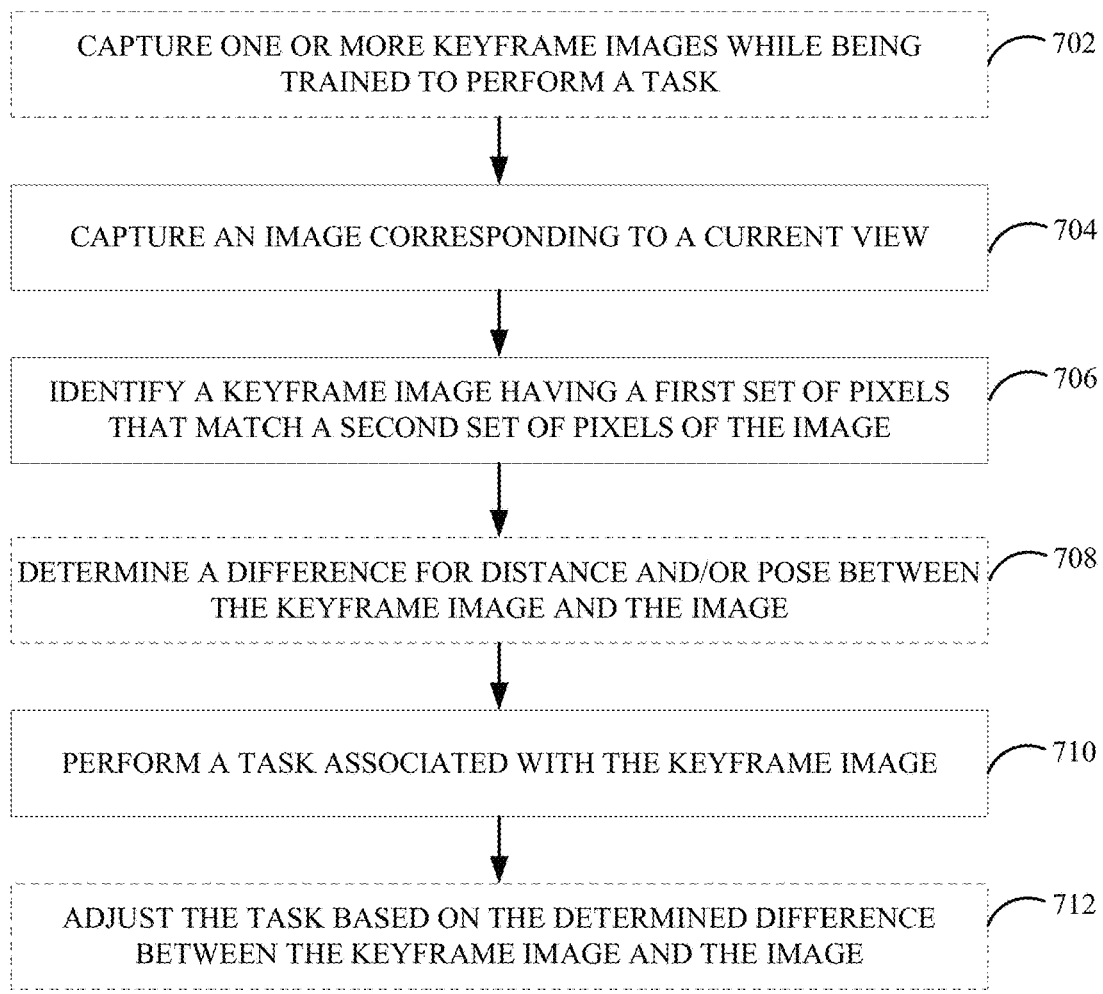
FIG. 7 illustrates a method for controlling a robotic device according to aspects of the present disclosure.

FIG. 7 illustrates a method 700 for controlling a robotic device according to an aspect of the present disclosure. As shown in FIG. 7, in an optional configuration, at block 702, the robotic device captures one or more keyframe images while being trained to perform a task. The task may include an interaction, such as opening a door, or navigation, such as navigating through an environment.

After training, at block 704, the robotic device captures an image corresponding to a current view. The image may be captured from one or more sensors, such as an RGB-D sensor. A pixel descriptor may be assigned each pixel of a first set of pixels of the keyframe image and a second set of pixels of the image. The pixel descriptors provide pixel level information as well as depth information. An area corresponding to the first set of pixels may be selected by a user.

At block 706, the robotic device identifies a keyframe image having a first set of pixels that match a second set of pixels of the image. The robotic device may compare the image to multiple keyframes. The robotic device may determine that the first set of pixels to match the second set of pixels when the respective pixel descriptors match.

In an optional configuration, at block 708, the robotic device determines a difference for at least one of distance, pose, or a combination thereof between the keyframe image and the image. The difference may be referred to as a pose delta. At block 710, the robotic device performs a task associated with the keyframe image. In an optional configuration, at block 712, the task is adjusted based on the determined difference between the keyframe image and the image.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling a robotic device, comprising:
   capturing an image corresponding to a current view of the robotic device;
   identifying a keyframe image based on matching one or more pixels of a first set of pixels associated with the keyframe image with one or more pixels of a second set of pixels associated with the image;
   determining, based on identifying the keyframe, a difference between a first relationship of a keyframe robotic device to a first object in the keyframe image and a second relationship of the robotic device to a second object in the image;
   adjusting a parameter associated with the task based on determining the difference between the first relationship and the second relationship, the task being associated with the keyframe image; and
   controlling the robotic device to perform a task based on adjusting the parameter.

2. The method of claim 1, further comprising capturing the keyframe image while training the robotic device to perform the task.

3. The method of claim 1, in which the task comprises at least one of interacting with an object, navigating through an environment, or a combination thereof.

4. The method of claim 1, in which:
   the first relationship corresponds to a pose of the keyframe robotic device in relation to a first object in the keyframe image; and
   the second relationship corresponds to a pose of the robotic device in relation to a second object in the image.

5. The method of claim 1, in which:
   the first relationship corresponds to a distance between the keyframe robotic device and a first object in the keyframe image; and
   the second relationship corresponds to a distance between the robotic device and a second object in the image.

6. The method of claim 1, in which:
   each pixel of the first set of pixels and the second set of pixels is associated with a pixel descriptor; and
   each pixel descriptor is associated with a set of values corresponding to pixel level information and depth information.

7. The method of claim 1, in which the parameter is associated with one or more of a velocity or a position associated with the task.

8. An apparatus for controlling a robotic device, comprising:
   a processor; and
   a memory coupled with the processor and storing instructions operable, when executed by the processor, to cause the apparatus to:
   capture an image corresponding to a current view of the robotic device;
   identify a keyframe image based on matching one or more pixels of a first set of pixels associated with the keyframe image with one or more pixels of a second set of pixels associated with the image;
   determine, based on identifying the keyframe, a difference between a first relationship of a keyframe robotic device to a first object in the keyframe image and a second relationship of the robotic device to a second object in the image;
   adjust a parameter associated with the task based on determining the difference between the first relationship and the second relationship, the task being associated with the keyframe image; and
   control the robotic device to perform a task based on adjusting the parameter.

9. The apparatus of claim 8, in which execution of the instructions further cause the apparatus to capture the keyframe image while training the robotic device to perform the task.

10. The apparatus of claim 8, in which the task comprises at least one of interacting with an object, navigating through an environment, or a combination thereof.

11. The apparatus of claim 8, in which:
the first relationship corresponds to a pose of the keyframe robotic device in relation to a first object in the keyframe image; and
the second relationship corresponds to a pose of the robotic device in relation to a second object in the image.

12. The apparatus of claim 8, in which:
the first relationship corresponds to a distance between the keyframe robotic device and a first object in the keyframe image; and
the second relationship corresponds to a distance between the robotic device and a second object in the image.

13. The apparatus of claim 8, in which:
each pixel of the first set of pixels and the second set of pixels is associated with a pixel descriptor; and
each pixel descriptor is associated with a set of values corresponding to pixel level information and depth information.

14. The apparatus of claim 8, in which the parameter is associated with one or more of a velocity or a position associated with the task.

15. A non-transitory computer-readable medium having program code recorded thereon for controlling a robotic device, the program code comprising:
program code to capture an image corresponding to a current view of the robotic device;
program code to identify a keyframe image based on matching one or more pixels of a first set of pixels associated with the keyframe image with one or more pixels of a second set of pixels associated with the image;
program code to determine, based on identifying the keyframe, a difference between a first relationship of a keyframe robotic device to a first object in the keyframe image and a second relationship of the robotic device to a second object in the image;
program code to adjust a parameter associated with the task based on determining the difference between the first relationship and the second relationship, the task being associated with the keyframe image; and
program code to control the robotic device to perform a task based on adjusting the parameter.

16. The non-transitory computer-readable medium of claim 15, in which:
the first relationship corresponds to a pose of the keyframe robotic device in relation to a first object in the keyframe image; and
the second relationship corresponds to a pose of the robotic device in relation to a second object in the image.

17. The non-transitory computer-readable medium of claim 15, in which:
the first relationship corresponds to a distance between the keyframe robotic device and a first object in the keyframe image; and
the second relationship corresponds to a distance between the robotic device and a second object in the image.

18. The non-transitory computer-readable medium of claim 15, in which:
each pixel of the first set of pixels and the second set of pixels is associated with a pixel descriptor; and
each pixel descriptor is associated with a set of values corresponding to pixel level information and depth information.

19. The non-transitory computer-readable medium of claim 15, in which the parameter is associated with one or more of a velocity or a position associated with the task.

\* \* \* \* \*